(12) United States Patent
Niizato

(10) Patent No.: US 6,619,355 B1
(45) Date of Patent: Sep. 16, 2003

(54) PNEUMATIC TIRE HAVING WHITE SIDEWALL RUBBER LAYER DISPOSED BETWEEN BLACK SIDEWALL RUBBER LAYERS AND WING RUBBER LAYER

(75) Inventor: Kazuyuki Niizato, Kakogawa (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/578,689

(22) Filed: May 26, 2000

(30) Foreign Application Priority Data

May 27, 1999 (JP) ............................... 11-148370

(51) Int. Cl.[7] .................. B60C 13/00; B60C 13/04; B60C 15/00
(52) U.S. Cl. .................. 152/523; 152/524; 152/552; 152/DIG. 12; 156/116
(58) Field of Search .................. 152/523, 524, 152/552, DIG. 12; 156/116

(56) References Cited

U.S. PATENT DOCUMENTS

| 3,830,274 A | | 8/1974 | Waser, Jr. |
| 3,937,862 A | * | 2/1976 | Dillenschneider ........... 428/409 |
| 4,265,292 A | * | 5/1981 | Inoue ........................ 152/546 |

FOREIGN PATENT DOCUMENTS

| GB | 1 017 464 A | | 1/1966 |
| JP | 55-164509 | * | 12/1980 |
| JP | 57 018502 A | | 1/1982 |
| JP | 60-128006 | * | 7/1985 |
| JP | 01-175509 | * | 7/1989 |

* cited by examiner

*Primary Examiner*—Michael W. Ball
*Assistant Examiner*—Justin Fischer
(74) *Attorney, Agent, or Firm*—Birch, Stewart, Kolasch & Birch, LLP

(57) ABSTRACT

A pneumatic tire has radially outer black sidewall rubber, radially inner black sidewall rubber, white sidewall rubber therebetween and a wing rubber layer contacting carcass, tread rubber layer and radially outer black sidewall rubber and white sidewall rubber. The radially outer black sidewall rubber extends from the tread edge (P1) to a point (P3) on the tire outer surface, contacts the wing rubber layer extending from the tread edge (P1) to a point (P2), and contacts the white sidewall rubber extending from the point (P2) to the point (P3). The white sidewall rubber is provided between the point (P3) and the point (P4) with a protrusion so that the thickness (DP) of the white sidewall rubber from outer surface to cords of carcass is not less than 4 mm. The maximum thickness (DS) of the radially outer black sidewall rubber is not less than 3 mm at the point (P2).

3 Claims, 2 Drawing Sheets

PNEUMATIC TIRE HAVING WHITE SIDEWALL RUBBER LAYER DISPOSED BETWEEN BLACK SIDEWALL RUBBER LAYERS AND WING RUBBER LAYER

The present invention relates to a pneumatic tire provided in the sidewall portion with a white rubber layer, more particularly to an improved tire sidewall structure being capable of preventing the white rubber form change of color due to adjacent black rubber.

In the pneumatic tires for motorcycles, passenger cars and the like provided in the sidewall portions with white veneer rubber, a part of the white rubber adjacent to black rubber is liable to change color because chemicals, e.g. antidegradant and the like spreads from the black rubber to the white rubber as time go by. Therefore, if the white veneer rubber on the black rubber is thin, the whole of the white rubber becomes dirty. If the thickness of the white veneer rubber is increased, this may be avoided, but the durability and steering stability are liable to deteriorate because the white rubber generally has a lower rigidity and a lower strength than the black rubber.

In case of motorcycle tires, in comparison with tires in other categories such as passenger car tire and the like, the sidewall portion becomes relatively small because the tread portion is curved with a relatively small radius of curvature and accordingly approaches the bead portion. As a result, the occupation of the white veneer rubber in the sidewall portion increases, and the durability and steering stability decreases since the deformation of the sidewall portion is especially larger during cornering. Thus it is difficult to increase the occupation of the white veneer rubber on the black rubber without deteriorating the durability, steering stability and the like.

It is therefore, an object of the present invention to provide a pneumatic tire, in which a white rubber layer disposed in the sidewall portion can be prevented from change of color without decreasing the durability steering stability and the like.

According to the present invention, a pneumatic tire comprises a tread rubber layer (2) disposed radially outside a carcass (6) to define a part of the tire outer surface between tread edges (P1), a side rubber layer (V) disposed axially outside the carcass (6) to define a part of the tire outer surface radially inward of each tread edge (P1), the side rubber layer (V) comprising a radially outer black sidewall rubber (15), a radially inner black sidewall rubber (16) and a white sidewall rubber (14) therebetween, a wing rubber layer (12) interposed between the tread rubber layer (2) and the side rubber layer (V), the surface of the wing rubber layer (12) consisting of a part (12a) contacting with the carcass (6), a part (12b) contacting with the tread rubber layer (2), and a part (12c) contacting with the radially outer black sidewall rubber (15) and the white sidewall rubber (14), and the surface of the radially outer black sidewall rubber (15) consisting of a part (15c) extending form the tread edge (P1) to a point (P3) on the tire outer surface, a part (15a) contacting with the wing rubber layer (12) and extending from the tread edge (P1) to a point (P2), and a part (15b) contacting with the white sidewall rubber (14) and extending from the point (P2) to the point (P3), the radially inner black sidewall rubber (16) extending radially inwardly from a point (P4) on the tire outer surface radially inside the point (P3) while contacting with the axially outside of the white sidewall rubber (14), the white sidewall rubber (14) provided between the point (P3) and the point (P4) with a protruding part (17) so that the thickness (DP) of the white sidewall rubber (14) in the protruding part (17) measured from the outer surface to cords of the carcass is not less than 4 mm, and the thickness (DS) of the radially outer black sidewall rubber (15) having a maximum value of not less than 3 mm at the point (P2).

An embodiment of the present invention will now be described in detail in conjunction with the accompanying drawings.

Figure 1:
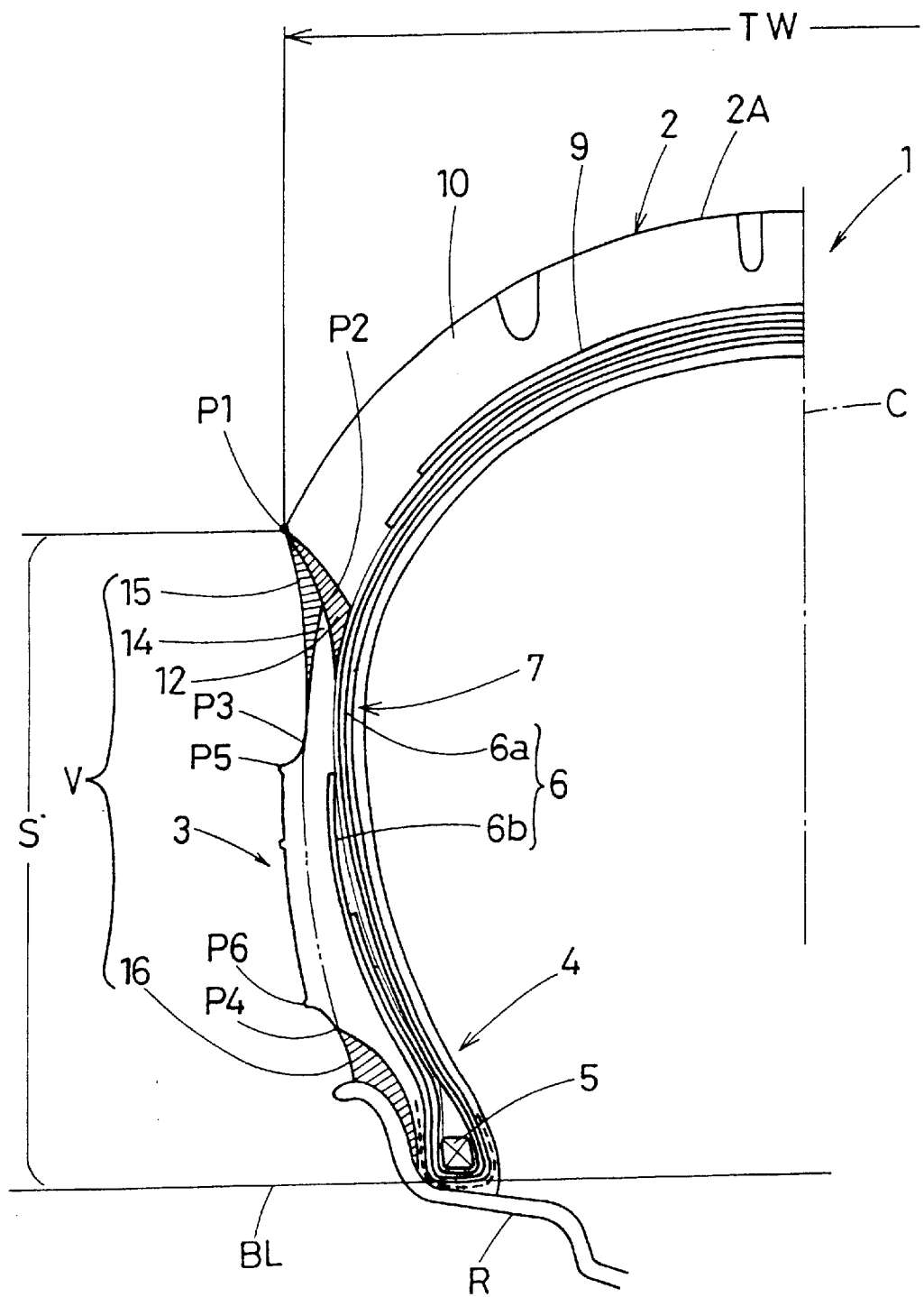
FIG. 1 is a cross sectional view of a pneumatic tire showing an embodiment of the present invention.
Figure 2:
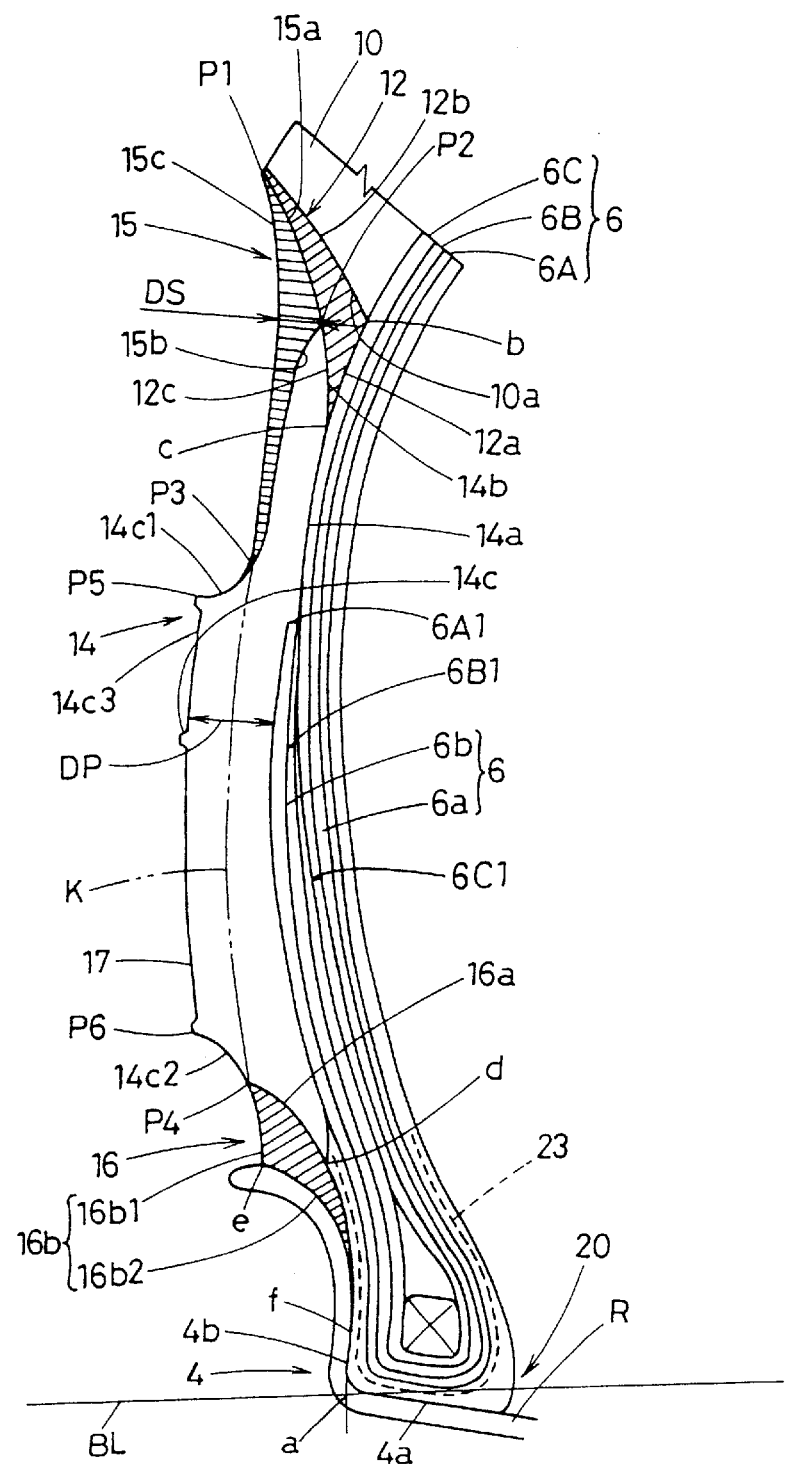
FIG. 2 is an enlarged cross sectional view of the sidewall portion thereof.

In FIGS. 1 and 2, the pneumatic tire 1 according to the present invention is for motorcycles, and a state in which the tire 1 is mounted on a standard wheel rim R and inflated to a standard inner pressure but loaded with no tire load is shown. Here, the standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. In case of passenger car tires, however, as the standard pressure, 180 kPa is used. Further, a standard load is the "maximum load capacity" in JATMA, the "Load capacity" in ETRTO, the maximum value given in the above-mentioned table in TRA or the like.

The pneumatic tire 1 comprises a tread portion 2, a pair of axially spaced bead portions 4 with a bead core 5 therein, a pair of sidewall portions 3 extending between the tread edges P1 and the bead portions 4, and a carcass 7 extending between the bead portions 4.

The carcass 7 comprises at least one ply of cords extending between the bead portions 4 through the tread portion 2 and sidewall portions 3 and turned up around the bead core 5 in each bead portion from the axially inside to the outside of the tire to form a pair of turnup portions 6b and a main portion 6a therebetween. In this example, the carcass 7 is composed of an inner ply 6A, a middle ply 6B and an outer ply 6C.

In the tread portion 2, a belt 9 is disposed radially outside the carcass 7. Further, a tread rubber 10 is disposed on the radially outside of the belt 9.

The tread rubber 10 extends between the tread edges P1 to define the tread face 2A. In a tire meridian section including the tire axis, the tread face 2A is curved convexly. As the tire in this embodiment is a motorcycle tire, the tread width TW is the maximum tire width or substantially equal to the maximum tire width. Here, the tread width TW is the axial distance between the tread edges P1 under a standard condition in which the tire is mounted on the standard rim and inflated to the standard load. The tread rubber 10 has a side face 10a extending radially inwardly and axially inwardly from each tread edge P1, the inner end (b) of the side face 10a is located on the outer surface of the carcass 7.

In a tire side region S radially inward of each tread edge P1, a side rubber V is disposed axially outside the carcass 7.

The side rubber layer V comprises a radially outer black sidewall rubber 15, a radially inner black sidewall rubber 16 and a middle white sidewall rubber 14 therebetween.

Further, a wing rubber layer 12 is interposed between the tread rubber 2 and the side rubber layer V. The surface of the wing rubber layer 12 consists of:

a part 12b abutting on the side face 10a of the tread rubber 10 and extending from the tread edge P1 to a point (b) on the outer surface of the carcass 7;

a part 12a abutting on the outer surface of the carcass 7 and extending from the point (b) to a radially inner point (c) on the carcass outer surface; and a part 12c extending from the tread edge P1 to the point (c). In this example, the wing rubber layer 12 has a substantially triangular cross sectional shape.

The surface of the radially outer black sidewall rubber 15 consists of:

a part 15a abutting on the surface part 12c of the wing rubber layer 12 and extending from the tread edge P1 to a point P2 about the middle of the surface part 12c;

a part 15b abutting on the axially outer surface of 14c of the white sidewall rubber layer 14 and extending from the point P2 to a point P3 on the tire outer surface; and a part 15c extending from the tread edge P1 to the point P3 to define a part of the tire outer surface. In this example, the radially outer black sidewall rubber 15 has a substantially triangular cross sectional shape.

The surface of the radially inner black sidewall rubber 16 consists of:

a part 16b1 extending radially inwardly from a point P4 to a point (e) both on the tire outer surface to define a part of the tire outer surface, wherein the tire outer surface contact with the flange of the wheel rim at the point (e);

a part 16b2 extending axially and radially inwardly from the point (e) to a point (f) near the bead bottom 4a to define a part of the tire outer surface which contacts with the wheel rim flange;

a part 16a extending from the point P4 to the point (f) and abutting on the axially outer surface 14c of the white sidewall rubber 14 from the point P4 to a point (d) between the points P4 and (f). The point (f) or the radially inner end of the radially inner black sidewall rubber 16 is set in a range of not more than the radial height of the rim flange.

The white sidewall rubber 14 extends from the above-mentioned point (b) to the point (d). In the range from the point (c) to the point (d), the axially inner surface 14a of the white sidewall rubber 14 abuts on the outer surface of the carcass 7. A part 14b of the surface from the point (c) to the point P2 abuts on the surface part 12c of the wing rubber layer 12.

The black sidewall rubber 15, 16 is a rubber compound containing at least one kind of polymer whose principal chain has no double bond such as chlorobutyl, EPDM and the like. The total content of at least one kind of polymer is in a range of from 35 to 75, preferably 40 to 60 parts by weight with respect to 100 parts by weight of the rubber polymer (for example, 100 parts by weight of the rubber polymer is 25 parts by weight of chlorobutyl and 25 parts by weight of EPDM and 50 parts by weight of natural rubber NR). An antidegradant which causes an unfavorable color change to the white rubber layer 14 is not used. In general, the antidegradant includes antiozonant, antioxidant, wax and the like, and a widely used antiozonant includes amine which causes color change. Therefore, such antiozonant is not used.

As the above-mentioned wing rubber layer 12 is interposed between the side rubber V and tread rubber 2 to secure the connection therebetween, the wing rubber layer 12 is made of a rubber compound which has a good bonding property with the tread rubber 10, radially outer black sidewall rubber 15, white rubber layer 14 and the topping rubber of the carcass 7. As the wing rubber layer 12 does not appear on the tire outer surface, it is not always necessary to add an antiozonant, but it is also possible to add.

The radial height of the point (d) at which the radially inner end of the white sidewall rubber 14 is disposed is set in a range of from 50 to 150%, preferably 70 to 130% (in this embodiment not more than 100%) of the height of the flange of the wheel rim.

Here, a radial height is measured from the bead base line BL under a standard condition in which the tire is mounted on the standard rim and inflated to the standard load.

As to the radially outer black sidewall rubber 15, the thickness measured normally to the axially outer surface 15c becomes maximum at the above-mentioned point P2, and the maximum thickness DS is set in a range of not less than 3 mm, preferably 3.5 to 4.5 mm, more preferably 4.0 to 4.5 mm. From the point P2, the thickness gradually decreases towards the radially outer end and inner end at P1 and P3, respectively. As a result, the radially outer black sidewall rubber 15 has a substantially triangular cross sectional shape.

Further, the radially outer end portion of the white sidewall rubber 14 is tapered towards the point P2.

In a range between the above-mentioned points P3 and P4, that is, between the edges of the radially outer black sidewall rubber 15 and the radially inner black sidewall rubber 16, the white rubber layer 14 appears on the outside of the tire and protrudes axially outwards of the tire. The protruding portion 17 increases the thickness DP of the white rubber layer 14 to increase the sidewall rigidity.

The surface of the protruding portion 17 consists of:

a radially outer concave part 14c1 extending from the point P3 to a point P5 radially inward and axially outward of P3;

a radially inner concave part 14c2 extending from the point P4 to a point P6 radially and axially outward of P4; and a generally convex part 14c3 between the points P5 and P6. In this embodiment, the convex part 14c3 is substantially parallel to a curved line drawn tangentially to the part 15c at point P3 and further tangentially to the part 16b1 at point P4. The thickness DP measured from the surface 14c3 to the cords of the carcass 7 normally to the surface 14c3 is set in the range of not less than 4 mm, preferably 4.5 to 5.5 mm, more preferably 5.0 to 5.5 mm. Further, the radial distance between the points P3 and P4 is preferably in a range of not more than 35 mm.

The protruding portion 17 in this embodiment extends continuously in the tire circumferential direction. But, it is also possible to break the protruding portion 17 regularly or irregularly in the tire circumferential direction as far as the rotational balance of the tire is maintained. Of course, letters, marks and the like can be provided on the surface of the white sidewall rubber 14.

As the thickness DP of the white rubber 14 is increased in the protruding portion 17, change of color by the antidegradant of the topping rubber of the carcass 7 can be prevented. Further, the rigidity is appropriately increased to improve the steering stability and durability.

In this embodiment, further, the radially outer ends of the turnup portions of the carcass plies 6A, 6B and 6C are disposed at different radial heights. In this example, the heights are gradually decreased from the axially outmost turnup portion to the axially innermost turnup portion. In other words, the radial heights are gradually decreased in the following order: the end 6A1 of the turnup portion of the inner ply 6A; the end 6B2 of the turnup portion of the middle ply 6B; and the end 6C1 of the turnup portion of the outer ply 6C. Furthermore, the ends 6A1, 6B1 and 6C1 of all the turnup portions are disposed in a radial height range between the points P5 and P6, whereby the rigidity in the protruding portion 17 is further improved, and so called cord-grooving—a circumferentially extending dent caused on the tire outer surface along the edge of the turnup portion—is effectively prevented.

Each bead portion 4 is provided with a reinforcing layer 23 made of organic fiber cords extending between the bead toe 20 and the bead heel 21 and extending radially outwards from the bead toe 20 and bead heel 21. The axially outer edge of the reinforcing layer 23 reaches to the radially inner end (point d) of the white sidewall rubber 14 and is disposed between the radially inner black sidewall rubber 16 and the carcass 6. The axially inner edge of the reinforcing layer 23 is also extended to the almost same radial height as the outer edge.

In this embodiment, the radially inner black sidewall rubber 16 and the radially outer black sidewall rubber 15 are the same rubber compound, but it is possible to increase the hardness of the radially inner black sidewall rubber 16 to improve the resistance to rim chafing.

Comparison Tests

Test tire of size 150/90-15 having the same structure shown in FIGS. 1 and 2 except for the thickness DP of the white rubber layer and rubber compounds for the black sidewall rubbers were made. The carcass was composed of three plies of nylon fiber cords arranged at 30 degrees with respect to the tire equator The carcass ply turnup portions' heights were 60, 50 and 40 mm (from the axially outside to the inside). The belt was composed of two plies of nylon fiber cords laid at 30 degrees with respect to the tire equator. The test tires mounted on a standard wheel rim of size 15×MT4.00 and inflated to an inner pressure of 280 kPa were tested as follows.

(1) Color Change Test

Under an accelerated condition, the change of color when exposed to outdoor for one week, two weeks, one month, three months, six months, one year and two years, was observed.

(2) Handling Stability Test

A Japanese motorcycle having a 1200 cc 4-cycle engine provided on the rear wheel with a test tire was run on a dry asphalt road in a test course, and the handling stability was evaluated by the test rider into five ranks. The high the rank, the better the handling stability.

(3) Durability Test

Using a drum tester, the test tire was run for 200 hours at a speed of 65 km/h under a tire load of 419 kgf at a room temperature of 25 deg. C., and the outside of the tire was checked and then the inside was checked by a cut-open inspection.

The test results and rubber compounds are shown in Tables 1 and 2.

TABLE 1

| | Tire | | | | | |
|---|---|---|---|---|---|---|
| | Ex. 1 | Ex. 2 | Ex. 3 | Ex. 4 | Ref. 1 | Ref. 2 |
| Rubber compound | | | | | | |
| Tread rubber | A | A | A | A | A | A |
| Wing rubber | B | B | B | B | B | B |
| Side rubber | | | | | | |
| Outer black rubber | C | C | C | C | B | D |
| Thickness DS (mm) | 3.2 | 3 | 3 | 3 | 3 | 3 |
| Middle white rubber | E | E | E | E | E | E |
| Thickness DP (mm) | 2 | 3 | 4 | 5 | 4.5 | 4.5 |
| Inner black rubber | C | C | C | C | B | D |
| Color change of White rubber | | | | | | |
| 1 week | A | A | A | A | A | A |
| 2 weeks | A | A | A | A | A | A |
| 1 month | A | A | A | A | A | A |
| 3 months | A | A | A | A | B | B |
| 6 months | B | A | A | A | B | B |
| 1 year | B | B | A | A | C | C |
| 2 years | C | C | A | A | C | C |
| Handling stability | B | B | A | A | B | B |
| Durability | A | A | A | A | B | B |

A: good
B: acceptable
C: not acceptable

TABLE 2

| | (parts by weight) | | | | |
|---|---|---|---|---|---|
| | Rubber compound | | | | |
| | A | B | C | D | E |
| Polymer | | | | | |
| Natural rubber | 24 | 40 | 50 | | 50 |
| Isoprene rubber | 16 | | | | |
| Butadiene rubber | 60 | | | | |
| Chlorobutyl rubber | | | 25 | | 50 |
| EPDM | | | 25 | | |
| SBR | | | | 100 | |
| BR | | 60 | | | |
| Carbon | | | | | |
| N550 | | 50 | | | |
| N660 | | | 40 | 60 | |
| N351 | 90 | | | | |
| Accelerator | 1.5 | 1 | 2 | 1.5 | 2 |
| Antidegradant | 2.5 | 3 | | 4 | 2 |
| Oil | 20 | 15 | 10 | 15 | |
| Sulfur | 1.5 | 1 | 0.5 | 1 | 1 |

From the test results, it was confirmed that the example tires according to the present invention can be improved in the color change, handling stability and durability.

As described above, in the present invention, the white sidewall rubber extends between a position near the tread edge and to the bead portion so as to form the major part of the tire sidewall. The thin part of the radially outer black sidewall rubber on the axially outside of the white sidewall rubber which extends from the point P3 towards the point P2 functions as a veneer rubber, and the thick part axially outside the point P2 has a function to secure the radially outer end of the white rubber deep in the tire sidewall. The wing rubber has a function to improve the bond between the white rubber and the tread rubber in cooperation with the radially outer black rubber. The radially inner black sidewall rubber has functions to protect the white rubber from the rim flange and to reinforce and veneer the radially inner part thereof. In the present invention, thus, the white rubber is disposed on the axially outside of the carcass instead of the usual black sidewall rubber and the radially outer and inner black sidewall rubber is used for the above explained supplemental purposes.

The present invention is suitably applied to a motorcycle tire of which aspect ratio is not less than 70% independently of a carcass structure—bias or radial—and belted or not. However, it is also possible to apply the present invention to other vehicle tires such as passenger car tires.

What is claimed is:

1. A pneumatic tire comprising
  a carcass (6) comprising at least one ply made of cords extending between bead portions (4) and turned up in each said bead portion from the inside to the outside of the tire to form a turnup portion,
  a tread rubber (2) disposed radially outside the carcass (6) to define a part of the tire outer surface between tread edges (P1),
  a white sidewall rubber (14) disposed on the axially outside the carcass (6) in each tire sidewall portion (3) and extending from a position (P2) near the tread edge (P1) to the bead portion (4),
  a radially outer black sidewall rubber (15) extending radially inwardly form the tread edge (P1) to a position (P3) on the axially outer surface of the white sidewall rubber (14),
  a radially inner black sidewall rubber (16) extending radially inwardly from a position (P4) on the axially outer surface of the white sidewall rubber beyond the radially inner end of the white sidewall rubber,
  a wing rubber layer (12) connecting the tread rubber to the radially outer black sidewall rubber (15) and the white sidewall rubber (14),
  the white sidewall rubber (14) provided with a protruding part (17) between said positions (P3) and (P4),
  the surface of the protruding portion extending from the point P3 to the point P4 consisting of a radially outer part (14c1) extending from the point P3 to a point P5 radially inward and axially outward of the point P3, a radially inner part (14c2) extending from the point P4 to a point P6 radially and axially outward of the point P4 and a part (14c3) extending between the points P5 and P6,
  the radial distance between the points P3 and P4 is in a range of not more than 35 mm,
  said turnup portion extending behind the protruding part (17),
  the thickness (DP) of the white sidewall rubber (14) in the protruding part (17) measured from the outer surface thereof to the carcass cords being more than 4 mm, and
  the thickness (DS) of the radially outer black sidewall rubber (15) being more than 3 mm at a radially outer end of the white sidewall rubber.

2. The pneumatic tire as set forth in claim 1, wherein each of the radially outer black sidewall rubber (15) and radially inner black sidewall rubber (16) contains a polymer whose main chain has no double bond.

3. The pneumatic tire as set forth in claim 1, wherein the carcass comprises three plies which are turned up in each bead portion from the inside to the outside of the tire to form three turnup portions, the radially outer ends of which are disposed axially inside said protruding part (17), and
the radial heights of the radially outer ends are gradually decreased from the axially outer turnup portion to the axially inner turnup portion.

\* \* \* \* \*